United States Patent [19]

Bütefisch

[11] Patent Number: 5,684,572
[45] Date of Patent: Nov. 4, 1997

[54] METHOD FOR DETERMINING THE VELOCITY OF A FLOW

[75] Inventor: Karl-Aloys Bütefisch, Bovenden-Eddigehausen, Germany

[73] Assignee: Deutsche Forschungsanstalt fur Luft-und Raumfahrt e.V., Bonn, Germany

[21] Appl. No.: 508,492

[22] Filed: Jul. 28, 1995

[30] Foreign Application Priority Data

Jul. 29, 1994 [DE] Germany .......................... 44 26 956.0

[51] Int. Cl.$^6$ ................................................ G01P 3/36
[52] U.S. Cl. ................................................ 356/28.5; 73/861
[58] Field of Search ............................... 356/28.5; 73/861

[56] References Cited

U.S. PATENT DOCUMENTS

| | | | |
|---|---|---|---|
| 3,984,685 | 10/1976 | Fletcher et al. ...................... | 356/28.5 |
| 4,707,698 | 11/1987 | Constant ............................... | 356/28.5 |
| 4,919,536 | 4/1990 | Komine ................................ | 356/28.5 |

FOREIGN PATENT DOCUMENTS 37 36 772   10/1987   Germany .

OTHER PUBLICATIONS

"Stromungs–und Teilchenmessung mittels Doppler–Anemometrie", by Franz Durst, Manfred Stieglmeier und Maris Ziema, pp. 15–23, 1993.

"Laser–und Avalanche–Dioden Fur die Geschwindigkeits–messung mit Laser–Doppler–Anemometrie", by D. Dopheide, M. Faber, G. Reim und G. Taux, pp. 291–302, 1987.

"Lasermethoden in der Stromungsmesstechnik", by B. Ruck, pp. 46–49.

Primary Examiner—Stephen C. Buczinski
Attorney, Agent, or Firm—Thomas, Kayden, Horstemeyer & Risley

[57] ABSTRACT

In a method for determing the velocity of a flow seeded with particles reflecting light, the particles located in a light sheet (4) are illuminated with monochromatic light (5). The doppler-shifted frequency of the light reflected sideways out of the light sheet (4) by the particles is determined, and the velocity of the flow is determined from the doppler-shifted frequency. The un-shifted frequency of the monochromatic light with which the particles in the light sheet are illuminated is determined continously, and is used as a basis for the determination of the velocity of the flow from the doppler-shifted frequency.

9 Claims, 3 Drawing Sheets

METHOD FOR DETERMINING THE VELOCITY OF A FLOW

FIELD OF THE INVENTION

This invention relates to a method for determining the velocity of a flow seeded with particles reflecting light, wherein the particles located in a light sheet are illuminated with monochromatic light, wherein the doppler-shifted frequency of the light reflected sideways out of the light sheet by the particles is determined, and wherein the velocity of the flow is determined from the doppler-shifted frequency.

The invention also relates to an apparatus for carrying out such a method comprising a laser emitting a laser beam, a light sheet optic expanding the cross section of the laser beam, and an analysis arrangement for the doppler-shifted laser frequency of the light reflected sideways out of the light sheet.

Methods making use of the doppler-effect for the measurement of a velocity are also designated as doppler-velocimetry or, when using laser light, as laser-doppler-velocimetry.

DESCRIPTION OF THE PRIOR ART

A number of methods similar to that described above are known which mainly differ with regard to how the doppler-shifted frequency of the light reflected by the particles is determined. Conventionally, this is performed with the aid of a spectrograph or an interference arrangement, by which the reflected light is brought into interference with light of unshifted frequency. However, in both of these variants the local resolution of the velocity determination is low. Just one (averaged) doppler-shifted frequency is determined for the whole reflected light analysed at the same time.

An improved method of the type described above is known from U.S. Pat. No. 4,919,536. According to this Patent the analysis arrangement for the doppler-shifted frequency of the laser light reflected sideways out of the light sheet comprises an imaging optic which images a part of the light sheet on a two-dimensional video detector, wherein a two-dimensional filter is arranged in an image plane of the imaging optic. This filter has a sharp absorption line which results in a spatial modulation of the intensity of the reflected laser light. Within dark areas the doppler-shifted frequency of the reflected laser light is identical with the frequency of the absorption line and, therefore, exactly determined. Through this method a very good local resolution is attained.

In all the methods of (laser-)doppler-velocimetry it is required to know exactly the frequency of the monochromatic light with which the particles in the light sheet are illuminated. Up to now, it has been attempted, for solving this problem, to stabilize the laser frequency of the laser emitting the monochromatic light. For this, however, a great deal of technique is required.

The present invention is based on the task of providing another approach to solve this problem.

SUMMARY OF THE INVENTION

According to a first embodiment of the invention this is attained, in an improved method of the kind described above, in that the un-shifted frequency of the monochromatic light with which the particles in the light sheet are illuminated is determined continually, and this determined un-shifted frequency is used as a basis for the respective determination of the velocity of the flow from the doppler-shifted frequency. By the continual determination of the un-shifted frequency a reference value for the evaluation of the doppler-shifted frequency is obtained. This method is completely independent of the stability of the laser frequency which can vary strongly, especially in large scale applications as they occur in wind tunnels. Additionally the use of pulsed lasers of high intensity in laser-doppler-velocimetry is possible for the first time. Normally, the laser frequency of pulsed lasers shows a significant scattering which makes them unsuitable for conventional doppler-methods.

In a second embodiment of the invention the un-shifted frequency of the monochromatic light with which the particles in the light sheet are illuminated is determined continually, and if this determined un-shifted frequency is within a predetermined tolerance interval around a pre-determined target frequency, the velocity of the flow is determined from the doppler-shifted frequency. This leads to the advantage that, with regard to conventional doppler-methods, no alteration to the determination of the velocity of the flow from the doppler-shifted frequency is necessary. Rather, the determination of the velocity is just restricted to such intervals of time in which the un-shifted frequency of the monochromatic light coincides exactly enough, depending on the accuracy presently requested, with the pre-determined target frequency. This already results In the same advantages as above. The pre-determined tolerance interval has to be substantially smaller than the expected difference between said un-shifted frequency and said shifted frequency. For example, a suitable pre-determined tolerance interval is, for example, ten times smaller than said difference. The actual relation is depending on the accuracy presently requested.

The methods according to the invention can be carried out with different devices. However, some of these devices have special advantages. Thus, in the simplest case, a device of the type described above is, according to the invention, characterized in that a filter is arranged in the laser beam which only lets light of a fixed frequency pass therethrough.

This frequency is the target frequency strived for. Thus, no particles in the light sheet are illuminated at all during those intervals of time in which the laser misses the target frequency.

Suitable filters which only let through light of a fixed frequency are known to those skilled in the art. Such a filter is described, for example, in U.S. Pat. No. 5,029,999. Therein, the absorption line of an absorption filter is split magnetically into two absorption lines arranged close to each other, whereby a sharply limited permission line is obtained. Simpler filters which only let through light of a fixed frequency are based on the application of diffraction or interference phenomena.

A device of the kind described above, which is, according to the invention, characterized in that a beam splitter is arranged in the laser beam which directs a part of the laser beam to a second analysis arrangement for the frequency of the laser beam, has especially far reaching application possibilities. Therein, the second analysis arrangement for enabling the frequency determination may comprise a means diffracting the laser beam dependent on its frequency or a means bringing the laser beam into interference with itself. A diffraction is dependent on the frequency of the laser beam if the level of excursion of the diffracted laser beam depends on its frequency.

To obtain a particular high local resolution of the velocity of the flow, the analysis arrangement may further comprise an imaging optic imaging a part of the light sheet on a two-dimensional video detector which is provided with an electronic image memory, wherein a two-dimensional filter is arranged in an image plane of the imaging optic which only lets through or absorbs light of a fixed frequency. This is the application of the features known from U.S. Pat. No. 4,919,536 to the invention. A feature which is also new with regard to U.S. Pat. No, 4,919,536 is to be seen in that the two-dimensional filter has as an alternative a sharply limited permission line, i.e. only lets through light of a fixed frequency. In principle, such filters are known from U.S. Pat. No. 5,029,999 as already discussed above.

To simplify the allocation of the velocities determined to special areas of the flow, a beam splitter may be arranged on the optical axis of the imaging optic in front of the two-dimensional filter. By means of said beam splitter part of the light sheet can be directly projected on a video detector. The same effect could be attained in that the two-dimensional filter is moved out of the way of the beam of light temporarily, or in that the two-dimensional filter is constructed to be switched on and off with regard to its filter function.

For restricting the evaluation of the doppler-shifted frequency for the velocity of the flow to those intervals of time in which the un-shifted frequency sufficiently coincides with the predetermined target frequency, the video detector may be a video camera having a shutter which can be triggered independently, wherein the second analysis arrangement emits the signal triggering the shutter. In this context it is clear that the second analysis arrangement for the un-shifted frequency of the laser beam emits the triggering signal exactly, when the laser frequency maintains the predetermined target frequency.

By taking into account the present un-shifted laser frequency in the evaluation of the doppler-shifted frequency the electronic image memory may save, besides the contents of the video detector, the presently corresponding frequency of the laser beam determined by the second analysis arrangement. If the device is additionally provided for taking unfiltered pictures of the flow, the image memory is also to be provided for them. In this case a complete set of data in the image memory includes the un-shifted frequency of the laser beam, a filtered picture of a part of the light sheet from which the doppler-shifted frequency is obtained, and an unfiltered picture of the same part of the light sheet.

The invention is explained and described in more detail below.

DETAILED DESCRIPTION OF THE INVENTION

Figure 1:
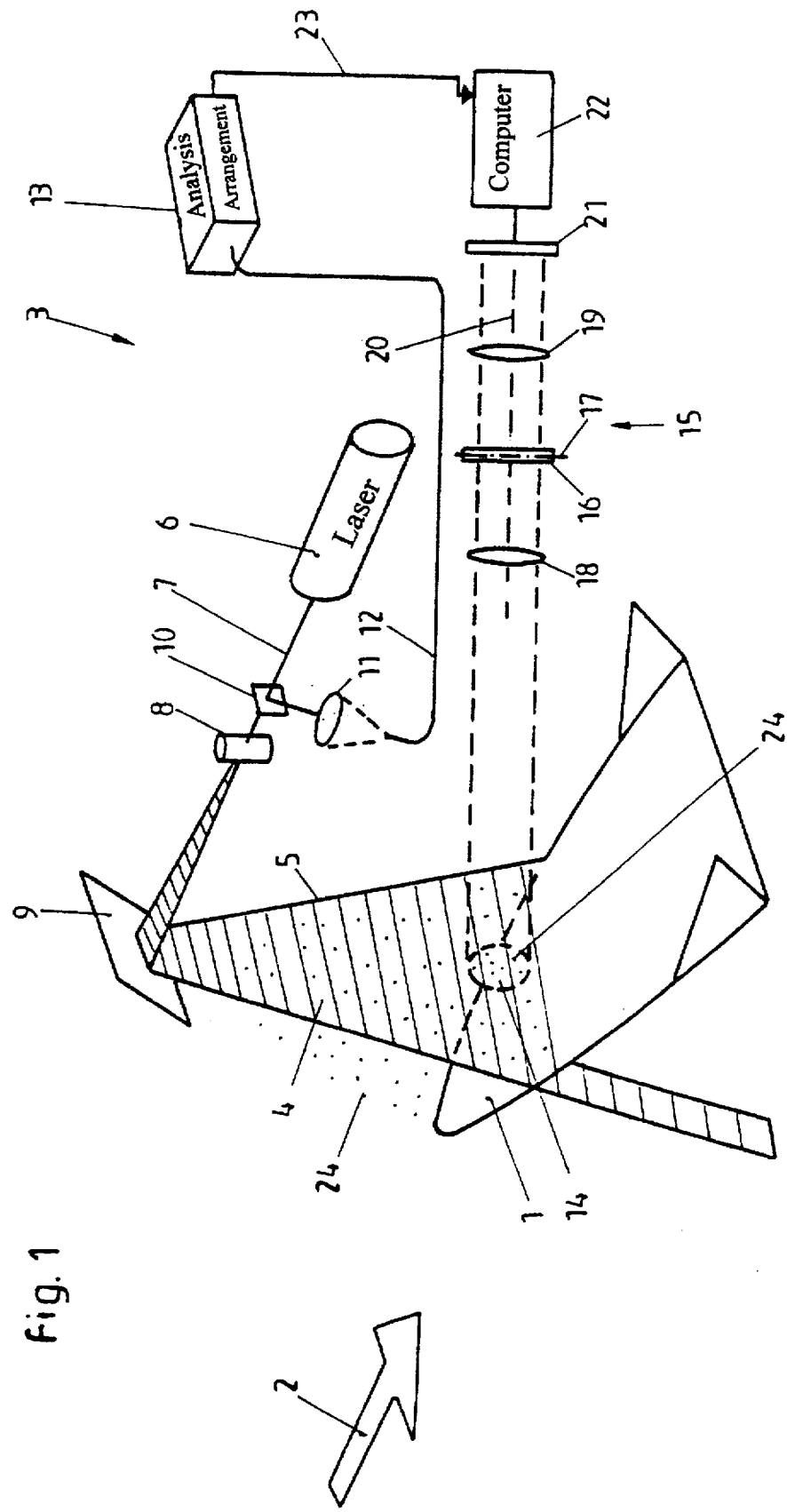
FIG. 1 schematically shows a preferred embodiment of an apparatus performing the method for determining the velocity of a flow.

Referring now to FIG. 1, a flow streams along a profile 1 in the direction of arrow 2. The flow is seeded with light reflecting particles 24. Device 3 determines the velocity of the flow in the region of a light sheet 4. The light sheet 4 has an essentially two-dimensional extension with a small thickness. In the light sheet 4 the light reflecting particles 24 are illuminated with monochromatic light 5. The monochromatic light 5 comes from a laser 6 whose laser beam 7 is expanded laterally by a cylinder lens 8. Afterwards, the expanded laser beam 7 is reflected by a mirror 9. The cylinder lens 8 and the mirror 9 form a light sheet optic 8, 9. A part of the laser beam 7 is, between the laser 6 and the cylinder lens 8, directed to a lens 11 by means of a beam splitter 10. A light guide 12 is positioned at the back of lens 8. The light guide 12 consists of optical fibers and leads to an analysis arrangement 13, in which the frequency of the laser beam 7 is determined. With regard to the invention the particular method of determining the frequency of the laser beam is not important. It is sufficient if it can be determined whether the frequency of the laser beam is within a predetermined tolerance interval around a predetermined target frequency, or the analysis arrangement 13 puts out the frequency quantitatively.

For determining the velocity of the flow in a part 14 of the light sheet 4, there is provided a further analysis arrangement 15. This second analysis arrangement 15 serves to determine the doppler-shifted frequency of the light which is reflected sideways out of the light sheet 4 by the light reflecting particles 24 located in the part 14. For this purpose, there is provided a two-dimensional filter 16 which absorbs light of a special doppler-shifted frequency, filter 16 having a sharp absorption line. The filter 16 is arranged in an image plane 17 of an imaging optic 18, 19 which has two lenses 18 and 19. Behind the imaging optic 18, 19 there is a two-dimensional video detector 21 arranged perpendicularly to the optical axis 20 of the imaging optic 18, 19. The imaging optic 18, 19 projects the part 14 of the light sheet 4 onto the video detector 21. On the video detector 21, the picture of the part 14 filtered by the filter 16 is dark, whereas the doppler-shifted frequency of the light reflected by the particles with does not coincide with the absorption frequency of filter 16 is bright. This picture is read out of the video detector 21 into a computer 22 for later evaluation. Here computer 22 serves as an electronic image memory.

The output signal 23 of the analysis arrangement 13 for the un-shifted frequency of the laser beam 7 can be taken into account in two different ways. If the output signal 23 includes the quantitative value of the frequency of the laser beam 7, this value can be saved in computer 22 together with the temporarily corresponding content of the video detector for being used in the evaluation later.

Figure 2:
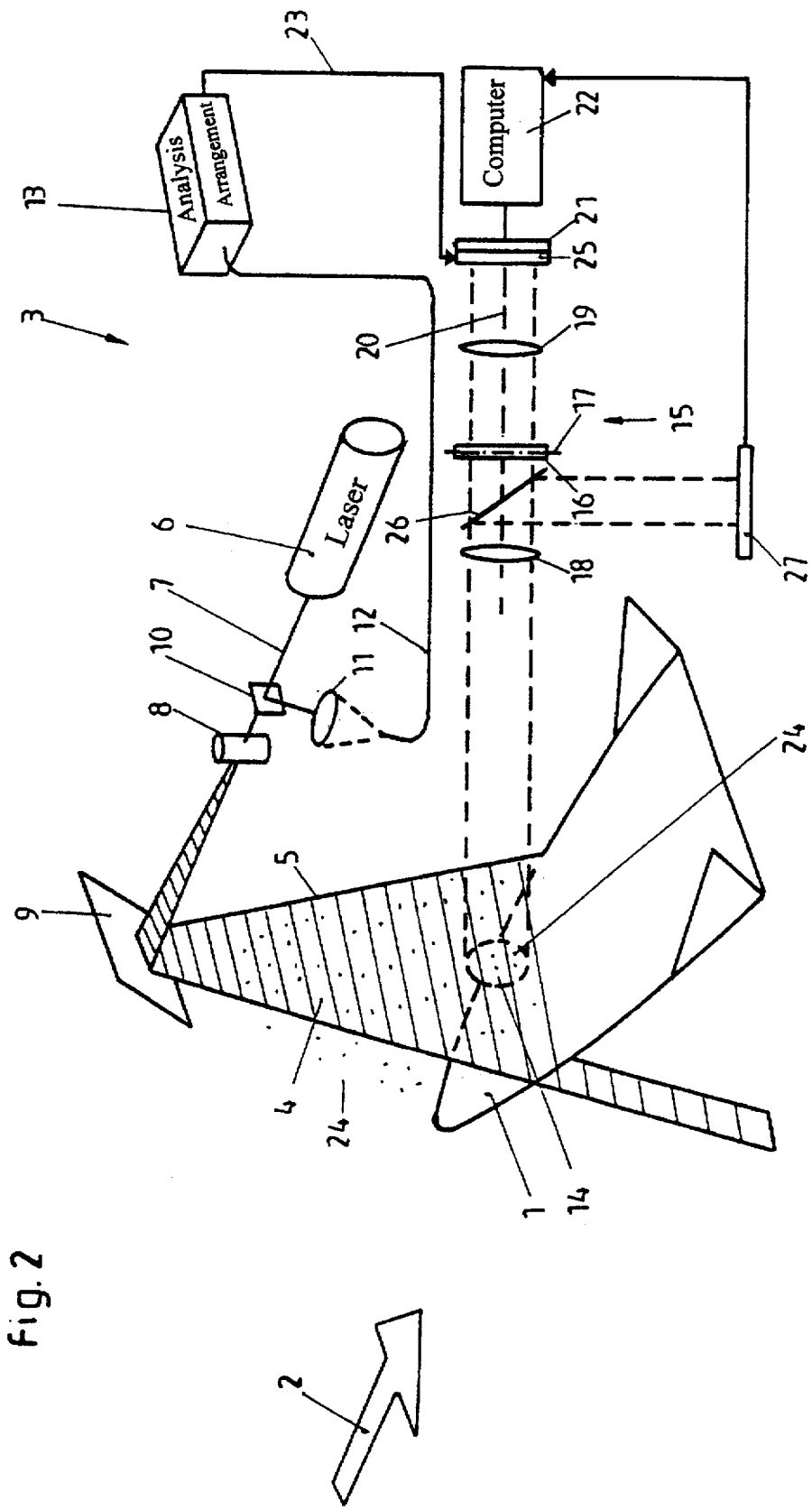
FIG. 2 Schematically shows an alternative embodiment of an apparatus performing the method of this invention.

If the output signal 23 just indicates whether the laser maintains a predetermined target frequency, the output signal 23 can be used for switching on and off the video detector 21 or the computer 22. This means, signal 23 cuts off the determination or the evaluation of the doppler-shifted frequency, always if the laser 6 does not maintain the predetermined target frequency. An example for such an embodiment of the device 3 is illustrated in FIG. 2, wherein the video detector 21 is constructed as a video camera having a shutter 25 which can be triggered freely. The shutter 25 is triggered by the output signal 23 of the analysis arrangement 13.

Additionally, the device 3 according to FIG. 2 comprises a beam splitter 26 on the optical axis 20 of the analysis arrangement 15 which directs a part of the light coming from part 14 of the light sheet 4 to another video detector 27. Video detector 27 serves to observe part 14 in an unfiltered way. The picture or part 14 obtained by the video detector 27 can also be saved in the computer 22.

Figure 3:
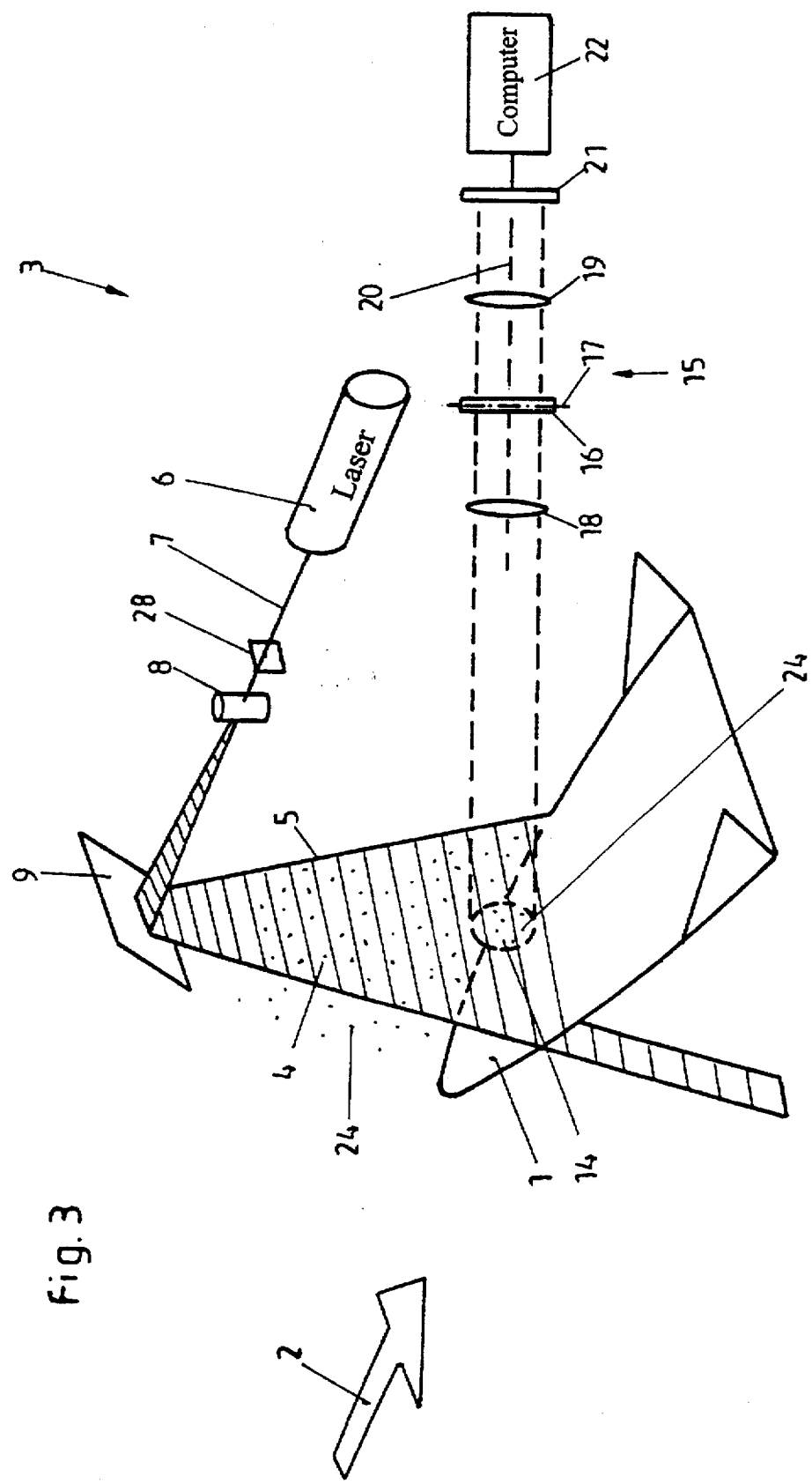
FIG. 3 Schematically shows another alternative embodiment of an apparatus performing the method of this invention.

The embodiment of device 3 according to FIG. 3 may be the simplest way to carry out the invention. Here the analysis arrangement for the un-shifted frequency of the laser beam reduced to a filter 28. Filter 28 only lets through light of the fixed target frequency of the laser 6. Therefore, the function of device 3 according to FIG. 3 is similar to the device 3 according to FIG. 2 in that only reflected light having the doppler-shifted frequency is registered, if the laser maintains its fixed target frequency.

The actual determination of the velocity of the flow in the part 14 based on the doppler-shift of the frequency of the laser beam 7 itself is known to those of ordinary skill in the art, and thus no detailed explanation is necessary here.

LIST OF REFERENCE SIGNS

1—Profile
2—Arrow
3—Device
4—Light Sheet
5—Monochromatic Light
6—Laser
7—Laser Beam
8—Cylinder Lens
9—Mirror
10—Beam Splitter
11—Lens
12—Light Guide
13—Analysis Arrangement
14—Part
15—Analysis Arrangement
16—Filter
17—Image Plane
18—Lens
19—Lens
20—Optical Axis
21—Video Detector
22—Computer
23—Output signal
24—Particle
25—Shutter
26—Beam Splitter
27—Video Detector
28—Filter

I claim:

1. A method for determining the velocity of a flow, comprising the steps of:
    seeding the flow with a plurality of light reflecting particles;
    continuously illuminating at least some of said particles within a light sheet with a means for producing monochromatic light;
    determining the doppler-shifted frequency of light reflected sideways out of said light sheet by said particles;
    determining the un-shifted frequency of the monochromatic light with which said particles in said light sheet are continuously illuminated; and
    determining the velocity of the flow from the doppler—shifted frequency, wherein the determined un-shifted frequency is used as a basis for the determination of the velocity of the flow from the doppler-shifted frequency.

2. A method for determining the velocity of a flow, comprising the steps of:
    seeding the flow with a plurality of light reflecting particles;
    continuously illuminating at least some of said particles located within a light sheet with a means for producing monochromatic light;
    determining the doppler-shifted frequency of light reflected sideways out of said light sheet by said particles;
    determining the velocity of the flow from the doppler-shifted frequency,
    determining the an-shifted frequency of the monochromatic light with which said particles in said light sheet are continuously illuminated; and
    determining the velocity of the flow from the doppler-shifted frequency only if the determined an-shifted frequency of the monochromatic light falls within a pre-determined tolerance interval around a pre-determined target frequency, the pre-determined tolerance interval being substantially smaller than the expected difference between said un-shifted frequency and said shifted frequency.

3. A device for determining the velocity of a flow seeded with a plurality of light reflecting particles, comprising:
    a laser emitting a laser beam;
    a light sheet optic extending laterally across said laser beam with respect to the length of said laser beam to form a light sheet;
    a first analysis means for determining the doppler-shifted laser frequency of the light reflected from said laser beam by said particles sideways out of said light sheet; and
    filter means positioned within said laser beam so that only light of a fixed target frequency may be passed therethrough.

4. A device for determining the velocity of a flow seeded with light reflecting particles, comprising:
    a laser emitting a laser beam;
    a light sheet optic extending laterally across said laser beam with respect to the length of said laser beam to form a light sheet;
    a first analysis means for determining the doppler-shifted laser frequency of the light reflected from said laser beam by said particles sideways out of said light sheet;
    a beam splitter positioned within said laser beam; and
    a second analysis means for determining the frequency of said laser beam, wherein at least a portion of said laser beam is directed into said second analysis means by said beam splitter.

5. The device of claim 4, wherein said first analysis means comprises an imaging optic, said imaging optic being sized and shaped to project at least a part of said light sheet onto a two-dimensional video detector, and wherein a two-dimensional filter is positioned within an image plane of said imaging optic so that said filter absorbs light of a fixed frequency.

6. The device of claim 5, wherein said video detector comprises a video camera having a shutter adapted to be triggered by a signal, and wherein said second analysis means emits said signal to trigger said shutter.

7. The device of claim 5, further comprising an electronic image memory adapted to save the contents of said video detector and the corresponding unshifted frequency of said laser beam as determined by said second analysis means.

8. The device of claim 5, wherein a beam splitter is positioned along the optical axis of said imaging optic in front of said two-dimensional filter, and wherein an unfiltered portion of the light reflected from said light sheet is projected onto a second video detector by said beam splitter.

9. The device or claim 4, wherein said first analysis means comprises an imaging optic sized and shaped to project at least a part of said light sheet onto a two-dimensional video detector, said video detector having an electronic image memory, wherein a two-dimensional filter is positioned within an image plane formed as a part of said imaging optic, and wherein said two-dimensional filter is adapted to only absorb light of a fixed frequency.

* * * * *